S. DAY.
Magazine Fire-Arm.
No. 2. A. I. Patented Jan. 23, 1838.
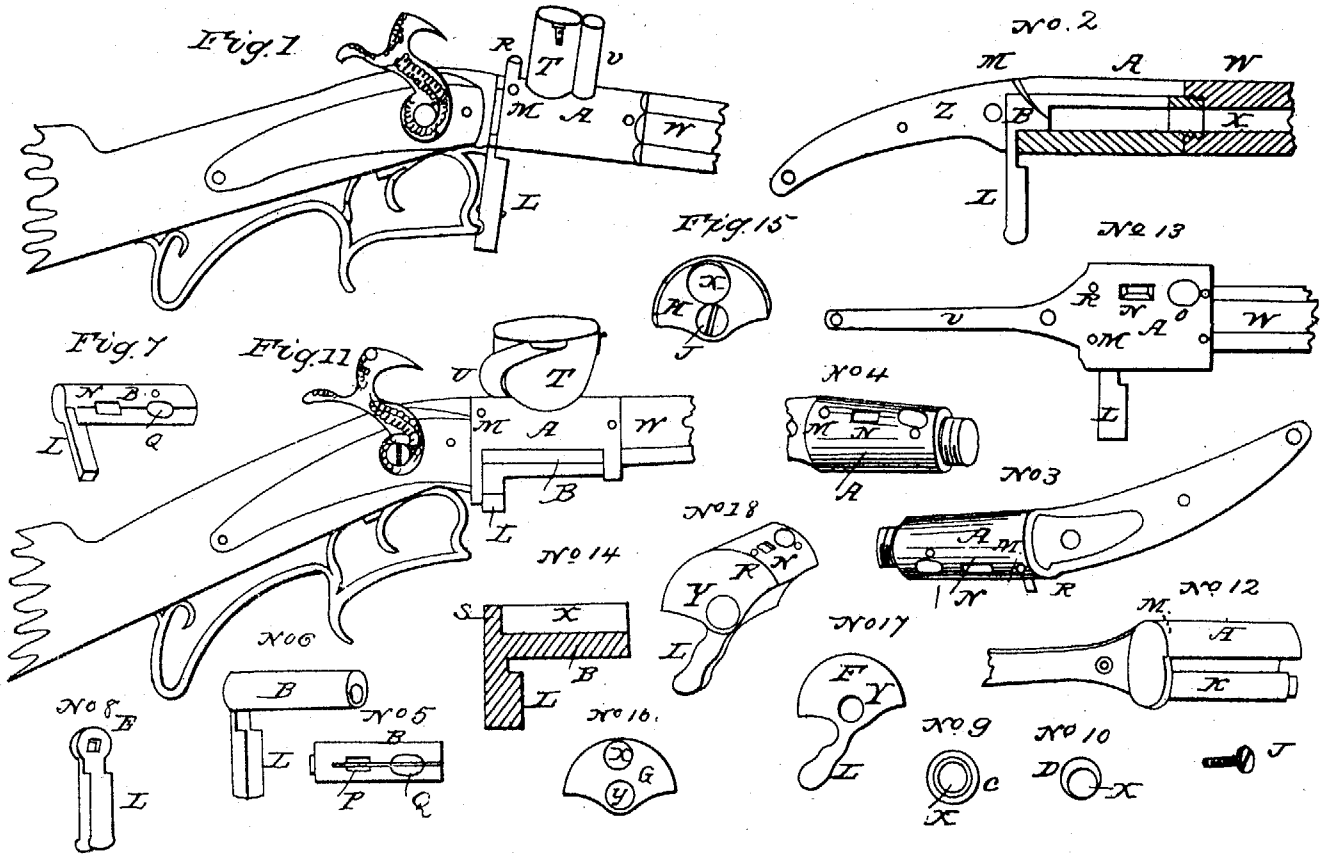

A I 2

UNITED STATES PATENT OFFICE.

SILAS DAY, OF NEW YORK, N. Y.

IMPROVEMENT ON HIS IMPROVED SELF-LOADING AND PRIMING FIRE-ARMS.

Specification forming part of additional improvement (No. 2) to Letters Patent No. 344, granted August 31, 1837, dated January 23, 1838.

*To all whom it may concern:*

Be it known that I, SILAS DAY, of the city, county, and State of New York, have invented a new and useful improvement upon my method lately patented of constructing self-loading fire-arms; and I do hereby declare that the following is a full and exact description.

It is called "Silas Day's Improvement upon his Self-Loading Rifle."

The nature of it consists in putting in the breech a vibrating half-cylinder or a semi-revolving cylinder, by turning which the powder, ball, and priming are admitted into the chamber.

To enable others skilled in the business to construct and use my invention, I proceed to describe its construction and operation.

The vibrating half-cylinder. (See annexed draft No. 18:) This is inclosed in a case, A, No. 12, and I, 15, and A, No. 13, through which there are holes for the balls, powder, and priming. The half-cylinder fits close into the case. In the top of it there are holes for the powder, balls, and priming, and the touch-hole, in which the hammer strikes. The chamber is bored close to the outer edge or entirely out. (See No. 14, X, and No. 16, X.) The handle is on the right side and extends out about an inch and a quarter. This case, as seen, No. 13, V, extends back in the form of a strap, and is fitted into the stock and secured to another strap on the bottom side of the stock.

The spindle K, No. 12, is about half an inch in diameter. It is the point or journal upon which the vibrating half-cylinder turns, the hole being in the center of the circumference of the vibrating half-cylinder seen at Y, Nos. 17 and 18. This spindle is made fast to the back end of the case, as seen at 12.

A cap is put into the outer end of the case, (see H, No. 15,) into which the barrel is fitted with a screw, so that the bore will be exactly even with the chamber when the handle is turned down. The cap is secured in its place by two screws down through the case.

The magazines T U are fitted upon the top of the case. That for the powder should be cup-shaped. (See No 11.) A spiral tube passes round it to contain the ball. That for the priming is a tube passing down through the powder-magazine inside. On the back end of this case, on the under side, is a pin or stop which the handle strikes when it is brought down and ready to fire.

Operation: The magazine being fitted with ten or more charges and as many balls and sufficient priming, the handle L is turned up till it strikes the strap. Meantime it receives the charge and priming. The handle is then turned down and the gun is ready to be discharged.

The other mode of construction is described in the drawing by the first ten numbers.

Figure No. 1, a view the gun upon this plan.

The outside cylinder, (A, Nos. 1, 2, 3, 4:) This is secured to the stock by a strap, Z, on the left-hand side, and on the top the magazine for the balls, powder, and priming, as seen at T U, No. 1, placed on the right-hand side at top, and braced or otherwise permanently secured. This cylinder is bored out somewhat conically from the back end on the right side, forming a hole large enough to receive the inside cylinder, which is ground in so closely that there will be no danger of explosion. This hole in the outside cylinder does not pass through the same size, but a jog is cut at the end, (see No. 2,) against which the end of the inside cylinder rests. The remainder of the hole is of the size of the bore of the rifle, and is cut at the lower side of the large bore, so that the chamber and bore will be in range when the handle is turned down.

The end of the outside cylinder has a screw upon the outside, on which the barrel is screwed.

When the outside cylinder is finished, the holes for the charge and priming are made, and the magazine bored into the right side at top and safely fitted with covers or valves; also a small tube for the percussion-priming is attached to the top back of the magazine. It is made strong and screwed in a little to the left. This is done before grinding in the inner cylinder. This outside cylinder is secured to the stock by three screws passing through the strap Z and the stock to the strap on the left side. On the top of the stock is a strap having a plate on the fore end, which passes down, covering the end of the stock. A strap is also on the under side, to which the trigger and

A I 2 guard are attached, and to which the top strap is fastened by two screws, one passing down through and one in the side.

The inside cylinder, (B, 5, 6, 7, annexed draft:) This has a handle attached to the back end. It is bored out eccentrically—that is, the chamber is bored so much on one side, D, No. 10, that it will cut out and leave a slot, very narrow, from one end to the other. The holes for charging are cut through this thin part, (No. 5.) The touch-hole is through the thick part opposite, that part being left thick and strong to render the gun safe from explosion, it being opposite the magazine.

The object of having the chamber bored upon one side is to make it so thin where the balls and powder enter that the inside cylinder will not catch upon the following ball and to leave it open, so that when the inside cylinder becomes heated with frequent firing it will not become tight by the expansion.

There is a slot or space left between the plate on the fore end of the stock and the back end of the outside cylinder, through which the handle passes up and down.

The handle is about an inch and a quarter in length. It is thin and broad where it passes in the slot and thicker and larger outside.

The handle is so attached to the inside cylinder that when turned up till it strikes the strap the holes for the balls and powder are opposite to the holes in the magazine, so that it can receive the charge. When the handle is brought down it is so made that it will strike the lower side of the strap, when the touch-hole comes opposite the hole in the outside cylinder, (marked *m*,) in which the hammer strikes, the touch-hole being made so as to pass the priming-magazine in turning up and also in turning down, so that it will be sure to be primed.

Operation: The gun being cocked or half-cocked and the magazine filled with from three to six charges, (more or less) the handle is turned up and the powder, ball, and priming enter the chamber. The handle is then turned down, in which movement the touch-hole passes again the priming-magazine and is thoroughly primed. The gun is now ready to be discharged. This plan is applicable to all kinds of fire-arms.

What I claim as my invention, and desire to secure by Letters Patent, is—

1. The mode of making the chamber near the top of the vibrating half-cylinder or entirely out at the edge, with the holes for the balls and powder and percussion-priming also in the thin part.

2. The mode of making the chamber in the round inside cylinder B, 5, 6, 7, on one side, so as to cut out through the side as far back as the chamber goes, leaving the other side thick and strong, which comes opposite the magazine when fired.

3. The mode of placing the magazine for priming on the left side, (or side opposite the magazine for powder and ball,) so that the touch-hole in the inner cylinder passes under it twice to receive priming.

SILAS DAY.

Witnesses:
OWEN G. WARREN,
L. F. WARREN.